(12) United States Patent
Rosenplänter

(10) Patent No.: US 8,371,485 B2
(45) Date of Patent: Feb. 12, 2013

(54) SPARE TIRE HOLDER AND INSTALLATION FOR A VEHICLE

(75) Inventor: Stephan Rosenplänter, Sulzheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 501 days.

(21) Appl. No.: 12/350,830

(22) Filed: Jan. 8, 2009

(65) Prior Publication Data

US 2009/0200345 A1 Aug. 13, 2009

(30) Foreign Application Priority Data

Jan. 9, 2008 (DE) .......................... 10 2008 003 642

(51) Int. Cl.
*B62D 43/04* (2006.01)

(52) U.S. Cl. ............... 224/42.13; 224/42.21; 224/42.23; 280/767; 296/37.2

(58) Field of Classification Search ............... 224/42.12, 224/42.13, 42.14, 42.21, 42.23; 296/37.2; 280/767; 414/463, 465
See application file for complete search history.

(56) References Cited

U.S. PATENT DOCUMENTS

| | | | | |
|---|---|---|---|---|
| 1,879,304 A | * | 9/1932 | Kennedy et al. | 414/463 |
| 2,028,945 A | * | 1/1936 | Morrison | 414/463 |
| 2,726,022 A | * | 12/1955 | Olson | 224/42.21 |
| 3,187,914 A | * | 6/1965 | Peras | 414/463 |
| 3,862,696 A | * | 1/1975 | McCauley et al. | 414/466 |
| 3,904,093 A | * | 9/1975 | Hanela | 224/42.21 |
| 4,060,270 A | * | 11/1977 | Croissant | 296/37.2 |
| 4,072,258 A | * | 2/1978 | Cruson | 224/42.21 |
| 4,428,513 A | * | 1/1984 | Delmastro | 224/42.21 |
| 4,573,855 A | * | 3/1986 | Braswell | 414/463 |
| 4,795,302 A | * | 1/1989 | Dalton | 414/466 |
| 4,884,729 A | * | 12/1989 | Barkouskie | 224/42.21 |
| 5,993,133 A | * | 11/1999 | Murray et al. | 414/463 |
| 6,648,577 B2 | * | 11/2003 | Obriot | 414/463 |

FOREIGN PATENT DOCUMENTS

| | | | | |
|---|---|---|---|---|
| DE | 1190824 B | 4/1965 | | |
| DE | 7740235 U1 | 4/1978 | | |
| DE | 4323621 C1 | 9/1994 | | |
| EP | 86690 A1 | * | 8/1983 | ................... 296/37.2 |

(Continued)

OTHER PUBLICATIONS

UK IPO, British Search Report for Application No. 0823504.6, dated Mar. 17, 2009.

(Continued)

*Primary Examiner* — Gary Elkins
(74) *Attorney, Agent, or Firm* — Ingrassia Fisher & Lorenz, P.C.

(57) ABSTRACT

A spare tire holder and installation for a vehicle is provided. To this end, the spare tire holder includes, but is not limited to a mount that can be pivoted downward in the tail region underneath the car body. The mount can furthermore be pivoted about a pivot joint. To this end, an actuating mechanism holds the mount in a locked position and releases the mount such that it can be pivoted into a pivoted position. In this case, the vehicle has a reduced vehicle overhang between the rear wheel axle and the tail. Two swing arms are furthermore arranged to both sides of the mount. The swing arms feature double-jointed hinges with two pivot joints per hinge.

10 Claims, 8 Drawing Sheets

FOREIGN PATENT DOCUMENTS

| | | | | |
|---|---|---|---|---|
| EP | 322299 | A1 * | 6/1989 | ............... 224/42.23 |
| EP | 0794108 | A1 | 9/1997 | |
| GB | 1366805 | A | 9/1974 | |
| JP | 2000168635 | A | 6/2000 | |

OTHER PUBLICATIONS

German Patent Office, German Office Action for Application No. 102008003642.0, dated Mar. 27, 2012.

* cited by examiner

SPARE TIRE HOLDER AND INSTALLATION FOR A VEHICLE

CROSS-REFERENCE TO RELATED APPLICATION

This application claims priority to German Patent Application No. 102008003642.0, filed Jan. 9, 2008, which is incorporated herein by reference in its entirety.

TECHNICAL FIELD

The invention relates to a spare tire holder and installation for a vehicle. The spare tire holder features a mount that can be pivoted downward in the tail region underneath the car body. The mount can furthermore be pivoted about a pivot joint. To this end, an actuating mechanism holds the mount in a locked position and releases the mount such that it can be pivoted into a pivoted position.

BACKGROUND

A spare tire is known from publication EP 0 794 108 A1. The known spare tire holder features an adapter for immobilizing a safety wheel in a receptacle for normal tires. To this end, the receptacle features a carrier that is mounted on the base plate of the vehicle such that it can be pivoted about a pivot joint.

Schematic drawings of such a known spare tire holder are illustrated in FIG. 7 to FIG. 9. More specifically, FIG. 7 shows a schematic drawing of a known spare tire holder in a locked position, FIG. 8 shows a schematic drawing of a known spare tire holder according to FIG. 7 in a pivoted position, and FIG. 9 shows a schematic drawing of the arrangement of the spare tire and the pivot joint of the spare tire holder according to the prior art.

FIG. 7 shows a schematic drawing of a known spare tire holder 2 in a locked position 9. In this locked position 9, the spare tire 19 is situated in a receptacle 41 that is held in its locked position 9 with the aid of an actuating mechanism 8. This receptacle 41 is fixed on a base plate 42 of the vehicle 3 by means of a pivot joint 7. The actuating mechanism 8 makes it possible to disengage the lock from the vehicle interior such that the receptacle 41 can be pivoted downward into a pivoted position 10 from the locked position 9 shown. During this process, the spare tire is displaced in the driving direction together with the receptacle 41 such that the removal of the spare tire is aggravated. The arrangement of the pivot joint 7 of the receptacle 41 furthermore defines the dimension for a minimum vehicle overhang 12 because the locking device 8 and the pivot joint 7 have a corresponding space requirement.

FIG. 8 shows a schematic drawing of the known spare tire holder 2 according to FIG. 7 in a pivoted position 10. Due to the relatively simple pivot joint 7 that pivots about the pivoting axis 43, the receptacle 41 can only be tilted in the direction of the ground 22 such that it is relatively difficult to remove the spare tire 19 from the tail region 5 in the pivoted position 10 underneath the vehicle 3. The problems associated with the removal of the spare tire from the receptacle 41 are illustrated in FIG. 9.

FIG. 9 shows a schematic drawing of the arrangement of the spare tire 19 and the pivot joint 7 of the spare tire holder 2 according to the prior art. The pivot joint 7 can also be divided into two adjacently arranged pivot joints 7' and 7" in order to realize a stable three-point suspension with the aid of the actuating mechanism 8 and the pivot joints 7' and 7". It is furthermore possible to arrange the actuating mechanism laterally in the position 8' so as to provide sufficient space for lowering the receptacle 41 into the pivoted position 10 from the locked position 9 shown in FIG. 7. During this pivoting process, however, the spare tire 19 is not displaced in the direction of the tail region 5, but rather in the direction indicated by the arrow C (i.e., in the driving direction), such that the spare tire 19 is disadvantageously moved deeper underneath the car body 6 due to this pivoting process.

In view of the foregoing, at least one objective exists to develop a spare tire holder that requires less space and also simplifies the removal of the spare tire from the spare tire holder. Another objective is to disclose such an installation method that the installation of a spare tire holder can be integrated into the current production sequence of a production line with only a few manipulations. In addition, other objectives, desirable features, and characteristics will become apparent from the subsequent summary and detailed description, and the appended claims, taken in conjunction with the accompanying drawings and this background.

SUMMARY

According to an embodiment of the invention, a spare tire holder is created and a method is provided for installing this spare tire holder on a vehicle in a production line. To this end, the spare tire holder features a mount that can be pivoted downward in the tail region underneath the car body. The mount can furthermore be pivoted about a pivot joint. To this end, an actuating mechanism holds the mount in a locked position and releases the mount such that it can be pivoted into a pivoted position. In this case, the vehicle has a shorter overhang between the rear wheel axle and the tail. In addition, two swing arms are arranged to both sides of the mount. The swing arms, in turn, are provided with double-jointed hinges that respectively feature two pivot joints.

This spare tire holder provides the advantage that merely a pivoted mount is arranged in the tail region underneath the car body instead of a receptacle known from the prior art. Such a mount initially makes it possible to advantageously reduce the weight. In addition, the mount is held by two laterally arranged swing arms with double-jointed hinges such that the spare tire holder can be advantageously accommodated in the tail region of a vehicle, in which the vehicle overhang is significantly shortened in comparison with conventional vehicles.

The lateral arrangement of the swing arms also provides the advantage that the double-jointed hinges of these swing arms not only make it possible to transfer the spare tire from a locked position into a tilted or pivoted position, but also to move or pull the pivoted mount in the direction of the tail region underneath the vehicle such that the removal of the spare tire from the mount is significantly simplified.

Furthermore, the new spare tire suspension advantageously takes into account new axle concepts such that, in contrast to conventional spare tire suspension concepts, a full-size spare tire can be accommodated underneath the vehicle despite a reduced vehicle overhang.

The double-jointed hinge that features two hinge points even makes it possible to pivot the mount such that the spare tire can be easily removed if a towing device is installed on the vehicle. The new spare tire holder furthermore makes it possible to accommodate the spare tire on the vehicle without having to alter the position of the actuating mechanism for locking and unlocking the spare tire holder.

In addition, the new spare tire holder can be used in a space-saving fashion for various types of vehicle bodies without having to alter or adapt the spare tire holder for this purpose. Consequently, the new spare tire holder can be used for all raised-seat vehicles by utilizing "carryover-parts" such that the alteration and development expenditures remain low. The pivoting mechanism and the construction of the double-jointed swing spring arms is also simplified and improved in such a way that the spare tire holder with the pivoted mount can be cost-efficiently manufactured.

In one preferred embodiment of the invention, a first pivot joint of an individual double-jointed hinge is fixed underneath and on the car body and a second pivot joint of the double-jointed hinge is connected to the pivoted mount of the spare tire holder. This measure increases the flexibility of the spare tire holder and the center of gravity that was arranged directly on the underside of the car body so far can now be arranged at a considerable distance from the underside of the car body due to the second pivot point that cooperates with the pivoted mount.

In one preferred embodiment of the invention, studs are already arranged on the bottom of the car body in the tail region. These studs make it possible to vertically displace and subsequently fix the hinge lugs of the double-jointed hinges thereon with the aid of lock nuts such that a time-saving and cost-efficient installation is ensured. In addition, the mount of the spare tire holder can be arranged between the double-jointed hinges. The ends of steel rods of the mount engage into corresponding eyes of the swing arms of the double-jointed hinges.

In another preferred embodiment of the invention, it is proposed that the mount features heat shields in the form of two laterally arranged guide plates that are arranged in the mount between the spare tire and hot components of the vehicle in the locked position. Such heat shields in the form of guide plates are provided as a precaution at locations, for example, at which a muffler or an exhaust pipe extends laterally past the mount. The spare tire can furthermore slide along such guide plates in the pivoted position and additionally simplify the removal of the spare tire in this fashion.

In order to protect the spare tire from contamination, dirt and aggressive salts, it is proposed to arrange a light-weight plastic trough for accommodating the spare tire in the mount of the spare tire holder. In this case, the plastic trough can be exactly adapted to the respective spare tire such that its weight is reduced because it does not have to absorb and transmit forces to the car body via joints as it is the case in embodiments known so far. Consequently, it is possible to utilize a plastic trough that not only is exactly adapted to the contours of the spare tire, but can also be manufactured with thin walls such that its weight is reduced.

It is furthermore proposed that the pivot joints of the double-jointed hinges are arranged vertically on top of one another and the swing arms are aligned vertically in the locked position. This provides the advantage that no shear stresses are exerted upon the joints of the double-jointed hinges and only the load resulting from the weight of the spare tire and the mount needs to be transmitted to the car body by the double-jointed hinges. In this arrangement, the mount and therefore also the spare tire are suspended on the underbody of the vehicle in a safe position, namely in the vertical position.

From this locked position, the spare tire holder can be transferred into a first pivoted position, in which the pivot joints of the double-jointed hinges are still arranged vertically on top of one another and only the mount is tilted toward the ground. This arrangement can be distinguished from the prior art in that the pivot joint is positioned lower, namely by the length of the swing arms. The pivot joints of the double-jointed hinges are only arranged on top of one another at a certain pivoting angle in a second pivoted position of the spare tire holder, in which the mount is tilted toward the ground and displaced toward the tail of the vehicle in the longitudinal direction thereof. In this position, not even a permanently installed tow hitch interferes with the removal of the spare tire.

In a second embodiment of the invention, the swing arms are bent in an L-shaped fashion and one of the limbs of the L of the swing arms forms the axle shafts of the first pivot joints of the double-jointed hinges. In addition, the ends of the second limbs of the L-shaped swing arms are provided with eyes, in which steel rod ends of the mount are arranged as axle shafts of the second pivot joints. This embodiment of the swing arms provides the advantage that a double-jointed hinge can be realized in the simplest fashion possible with steel rods only.

An installation method for a spare tire holder in a production line comprises the following steps. Initially, a spare tire holder and laterally arranged double-jointed hinges consisting of two pivot joints, as well as a swing arm and a spare tire, are assembled into a compact installation unit. This compact installation unit can be vertically mounted on the installation studs arranged on the vehicle floor with the corresponding hinge lugs.

The mount can be simultaneously latched into a locked position by means of a first and a second locking element. In this case, a first locking element serves for subsequently fixing the spare tire holder in the locked position from the interior of the car body and a second locking element merely represents a clamp element or spring hook element that is suspended from the floor of the car body in order to be latched into the mount of the spare tire holder. The thusly achieved double-safety ensures that the mount does not pivot downward together with the spare tire in a working position along the production line and obstruct the manufacturing sequence during the installation work in the elevated installation phase.

The assembly of the mount can be simplified by using prefabricated steel rods. The already installed installation studs on the underside of the car body also simplify the attachment of the hinge lugs of the first pivot joints of the double-jointed hinges on the vehicle body by means of self-locking nuts. Consequently, the mount is completely secured in its first locked position, in which it latches into a first and a second locking element. The first locking element features a hook that is suspended on a threaded screw and the second locking element preferably features a plastic spring hook.

The threaded screw of the first locking element protrudes into the interior of the car body and can be actuated from this location such that the spare tire holder can be lifted into a first locked position by means of this actuating mechanism. However, this makes it necessary to move the vehicle from an elevated installation position into a normal installation position with the aid of the installation platform before the spare tire holder can be screwed up into its second locked position.

The swing arm is preferably bent in an L-shaped fashion and one limb of the L-shaped swing arm serves as the axle shaft of the first pivot joint. The second end of the second limb of the L-shaped swing arm is bent into an eye such that a steel rod end of the mount can be inserted into the eye. This steel rod end respectively forms the axle shaft of the second pivot joint of the double-jointed hinges. Consequently, the two pivot joints are realized in the simplest fashion possible because the respective steel rod ends are merely arranged in a corresponding eye or rotatably arranged in a corresponding hinge bore.

No ball bearings or other precision components whatsoever are used such that the new spare tire holder can be cost-efficiently manufactured. Due to the new lateral hinge positions, the assembly can be realized directly in the vertical direction and automatically. It is furthermore ensured that the new double-jointed hinges do not obstruct the existing manufacturing process because the vehicle needs to be transferred into an elevated installation position anyway in order to install the axles such that it is possible to fix the double-jointed hinges on the floor of the body together with the mount of the spare tire holder suspended thereon and the spare tire inserted therein.

In addition, the dimensions of the mount can be chosen such that spare tires of different sizes and for different vehicles can be accommodated in the spare tire suspension and secured from tilting downward. In this case, a double-safety is ensured during the installation with the aid of two different locking elements that are simultaneously latched during the installation. Instead of a spring hook safety, it would also be possible to provide locking elements in the form of spring-type clamps.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
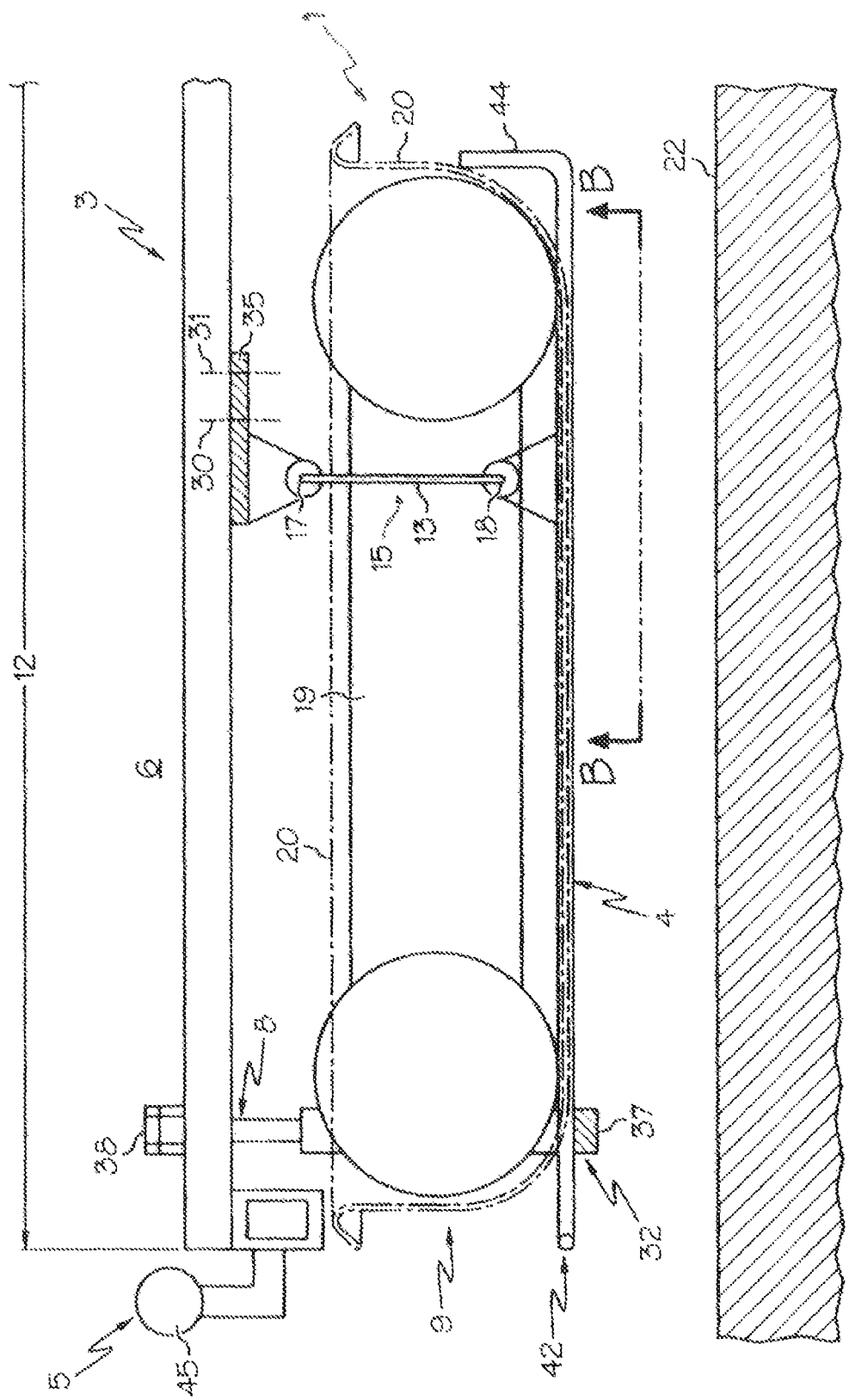
FIG. 1 shows a schematic side view of a spare tire holder according to a first embodiment of the invention in a locked position.

FIG. 1 shows a schematic side view of a spare tire holder 1 according to a first embodiment of the invention in a locked position 9. The spare tire holder 1 of this embodiment of the invention features a mount 4 which can be pivoted downward and is arranged in the tail region 5 underneath the car body 6. The mount 4 can furthermore be pivoted into two different pivoted positions about double-jointed hinges 15 and 16. An actuating mechanism 8 holds the mount according to this schematic drawing in the locked position 9 and makes it possible to release the mount 4 in order to pivot the mount into a pivoted position.

To this end, the actuating mechanism 8 features a locking screw 38 which can be actuated from the vehicle interior in the tail region 5 and cooperates with a locking hook 37. The locking hook 37 can be latched into the mount 4 of the spare tire holder 1 and screwed up into a final first locked position 9 by means of a threaded connection with the locking screw 38. In this first locked position 9, the double-jointed hinge 15 is aligned vertically with its swing arm 13 such that the pivot joints 17 and 18 are arranged vertically on top of one another.

In order to protect the spare tire 19 from dirt and contamination, as well as from aggressive erosion caused by salts, the mount 4 may carry a plastic trough 20 that is indicated with double dot-dash lines. In this example, the plastic trough 20 is a lightweight plastic material that reduces the weight and only has the function of protecting the spare tire 19, but does not have to transmit and withstand any forces such as, for example, a receptacle. The wall of this plastic trough 20 can therefore be suspended in the mount 4 in a weight-saving fashion, wherein the contour of the plastic trough 20 can be adapted to different shapes of spare tires.

The upper pivot joint 17 is fixed on two vertically arranged installation studs 30 and 31 (See FIG. 2) on the underside of the car body 6 by means of a hinge lug 35 while the second pivot joint 18 is connected to the mount 4 such that the mount 4 can be pivoted about the pivot joint 18, as well as about the pivot joint 17, by means of the swing arm 13. To this end, the mount 4 is preferably manufactured of steel rods.

Figure 2:
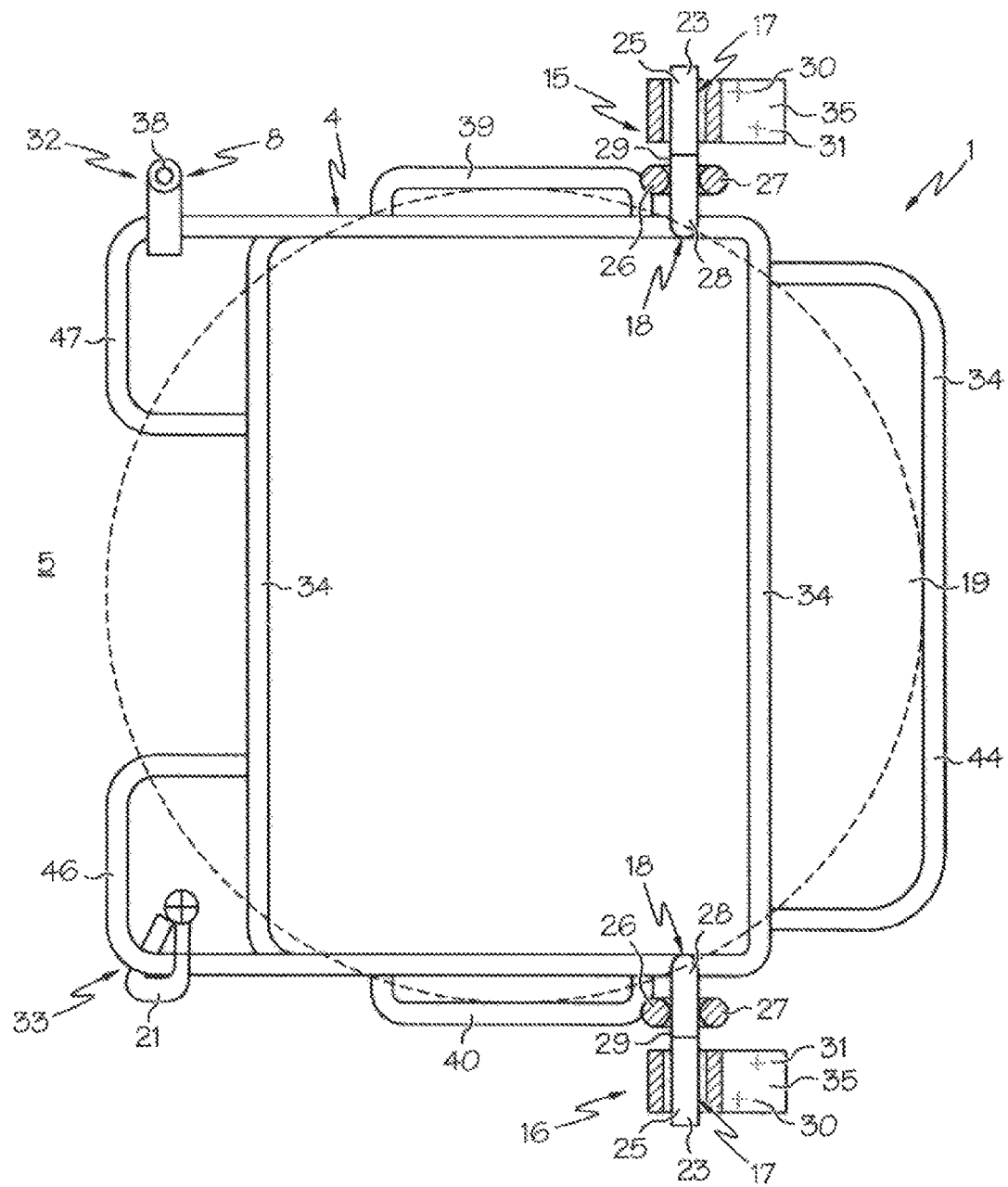
FIG. 2 shows a schematic bottom view of the spare tire holder according to FIG. 1.

The mount 4 with the double-jointed hinges 15 and 16, the spare tire 19 and, optionally, the plastic trough 20 can be preassembled and fixed underneath the vehicle 3 in the form of a complete unit during an elevated installation phase in a production line, namely by simply screwing the hinge lugs 35 of the two double-jointed hinges shown in FIG. 2 on the installation studs 30 and 31. This is preferably realized with lock nuts and this complete unit can also be suspended in a preliminary second locked position during the installation, in which it is secured by the actuating mechanism 8 shown in FIG. 1 on one hand and by the additional suspension and latching realized by means of a spring hook on the other hand.

FIG. 2 shows a schematic bottom view of the spare tire holder according to FIG. 1. In this case, the direction of the bottom view is indicated by the arrows B in FIG. 1. The circumference of the spare tire 19 is indicated with a broken line and the pivot joints 17 and 18 are illustrated in a partially sectioned fashion in order to elucidate their function in this bottom view. The two double-jointed hinges 15 and 16 are arranged laterally on the mount 4 and therefore also offset laterally referred to the spare tire 19. The frame of the mount is illustrated in an idealized fashion in this figure and adapted to the structure of the spare tire 19, wherein the mount 4 essentially consists of steel rods 34.

Guide plates 39 and 40 arranged on the sides of the mount 4 may simultaneously act as heat shields in order to protect the mount from hot components of the vehicle. The mount 4 features a bar 44 that is offset relative to the double-jointed hinges 15 and 16 in the driving direction and holds the spare tire 19 in position. Two other bars 46 and 47 of the mount 4 arranged in the tail region not only simplify the handling of the mount 4, but also serve for latching two locking elements 32 and 33 for an installation phase, as well as for the operation of the vehicle. To this end, the locking element 33 features an auxiliary safety in the form of a spring hook 21 while the locking element 32 is connected to the actuating mechanism 8 illustrated in FIG. 1 in order to fix the mount 4 underneath the vehicle in a final first locked position 9 during a normal installation phase that follows the elevated installation phase.

The vertically aligned swing arm 13 in FIG. 1 is realized in an L-shaped fashion and has a limb 23 that is rotatably supported in the pivot joint 17 mounted on the underside of the car body 6 as an axle shaft 25. The end 26 of the second limb of the L-shaped swing arms 13 and 14 features an eye 27, into which a steel rod end 29 of the mount 4 protrudes as an axle shaft 28. This ensures a high mobility and pivoting capacity of the mount 4 once the mount 4 is released from the actuating mechanism 8 and from the locking elements 32 and 33 in order to be pivoted.

Figure 3:
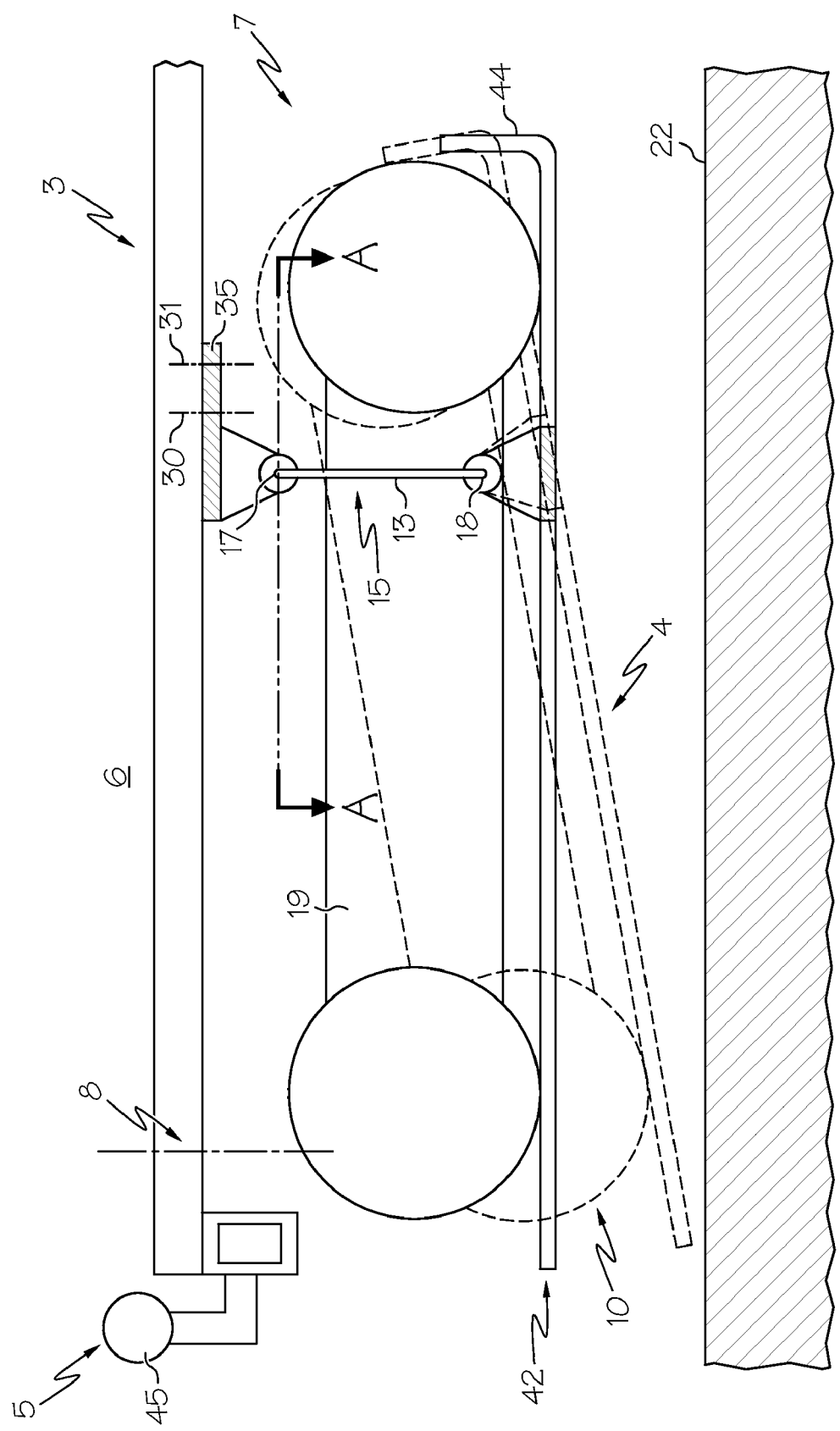
FIG. 3 shows a schematic side view of the spare tire holder according to FIG. 1 in a first pivoted position.

FIG. 3 shows a schematic side view of the spare tire holder 1 according to FIG. 1 in a first pivoted position. The spare tire 19 is indicated in the pivoted position 10 with broken lines in this simplified schematic drawing. The swing arm 13 is still aligned in the vertical direction in this first pivoted position such that the mount 4 is simply tilted about the pivot joint 18 of the double-jointed hinge 15. For this purpose, the actuating mechanism 8 was loosened to such a degree that the locking element 32 illustrated in FIG. 2 can be disengaged and the spring hook 21 illustrated in FIG. 2 that acts as the second locking element 33 can be once again removed from the mount 4.

Figure 4:
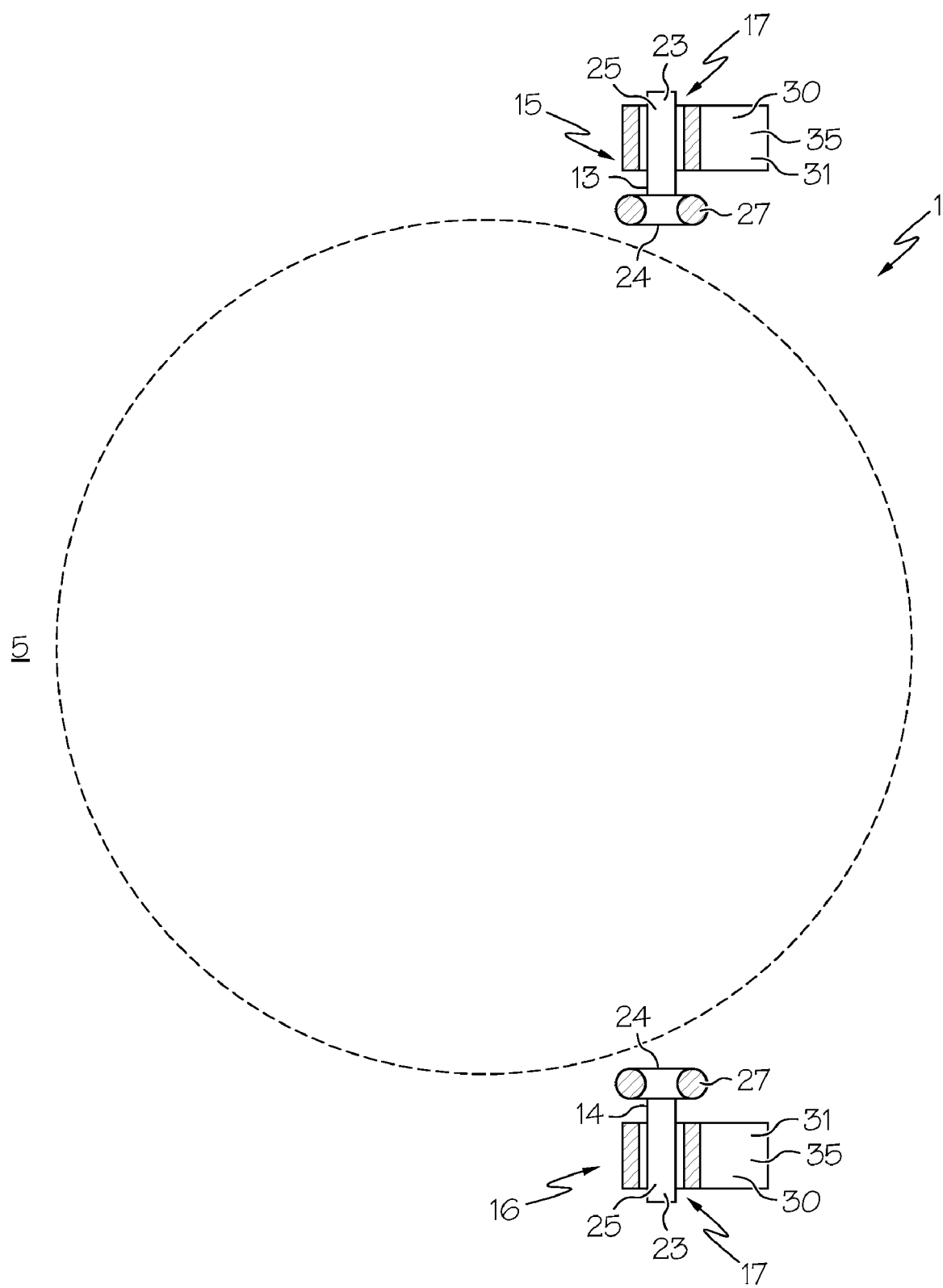
FIG. 4 shows a schematic top view with sectional representations of the swing arms of double-jointed hinges.

FIG. 4 shows a schematic top view with sectional representations of the swing arms of the double-jointed hinges 15 and 16 according to FIG. 3. The spare tire 19 is once again indicated by a broken line while the pivot joints 17 and 18 are partially sectioned. This view along the plane of section A-A in FIG. 3 indicates that the swing arms 13 and 14 of the double-jointed hinges 15 and 16 are realized in an L-shaped fashion and form the axle shaft 25 of the pivot joint 17 with one limb while the end of the second limb of the respective swing arm 13 or 14 features an eye 27 that is laterally sectioned in FIG. 4 and makes it possible to accommodate a steel rod end of a not-shown mount.

Figure 5:
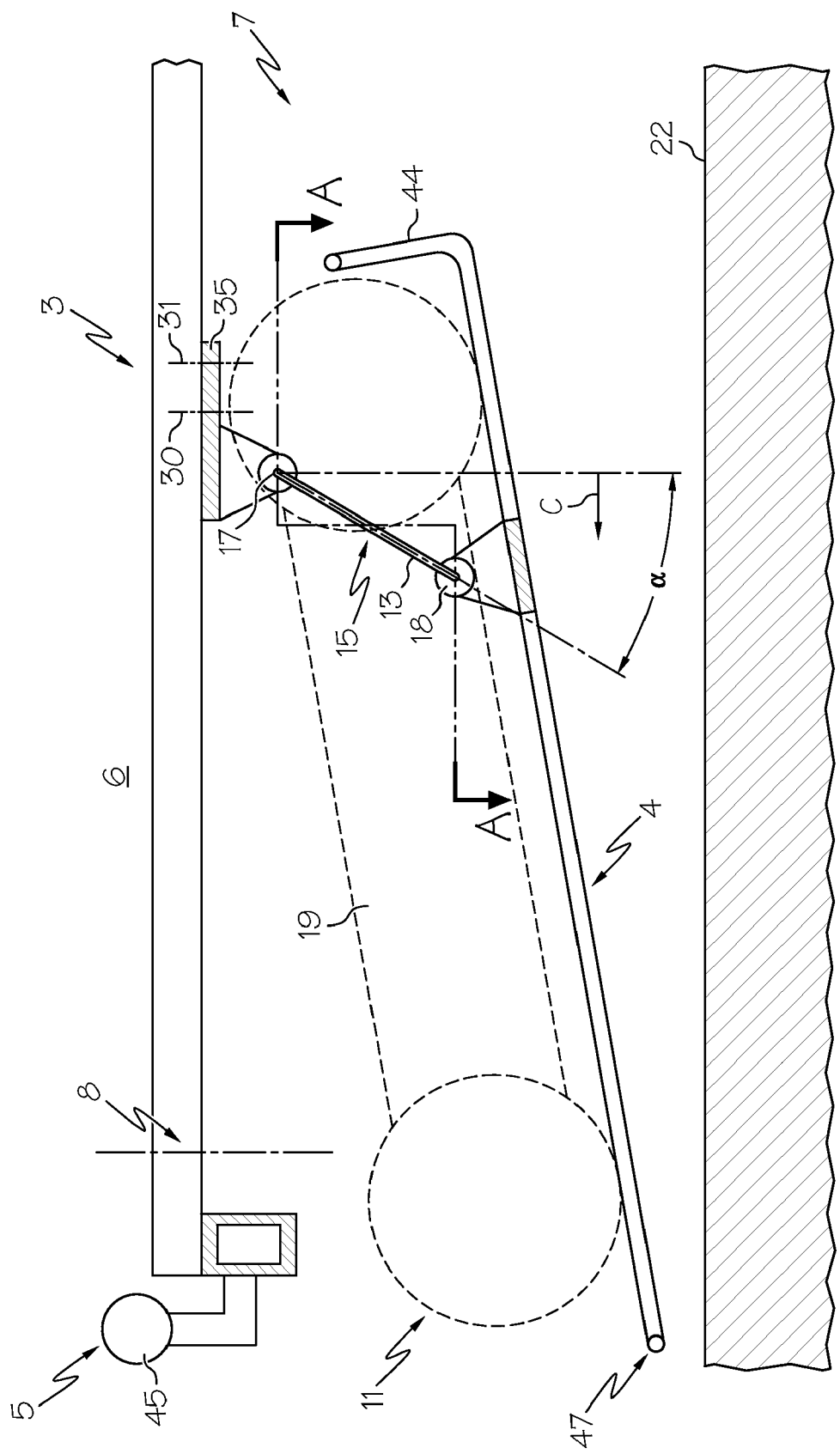
FIG. 5 shows a schematic side view of the spare tire holder according to FIG. 1 in a second pivoted position.

FIG. 5 shows a schematic side view of the spare tire holder 1 according to FIG. 1 in a second pivoted position 11. In this second pivoted position 11, the mount 4 was pulled underneath a tow hitch 45 on the bar 47 such that the double-pivoted joint 15 now has a pivoting angle α and the two pivot joints 17 and 18 consequently are no longer arranged vertically on top of one another. However, the removal of the spare tire 19 from the mount 4 is now simplified because the spare tire is displaced toward the tail region 5 of the vehicle 3 in the direction of the arrow C.

Figure 6:
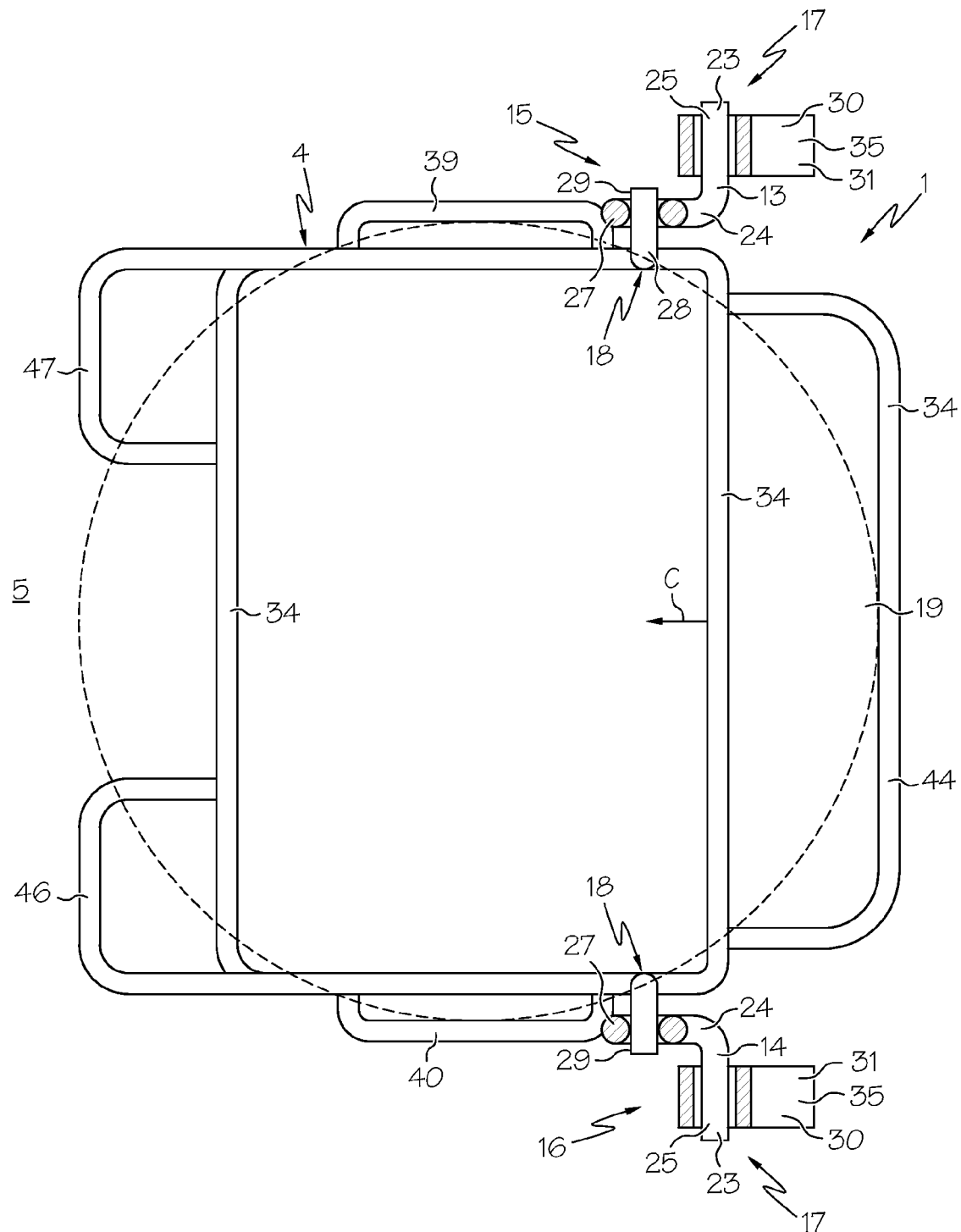
FIG. 6 shows a schematic bottom view of the spare tire holder according to FIG. 5.
Figure 7:
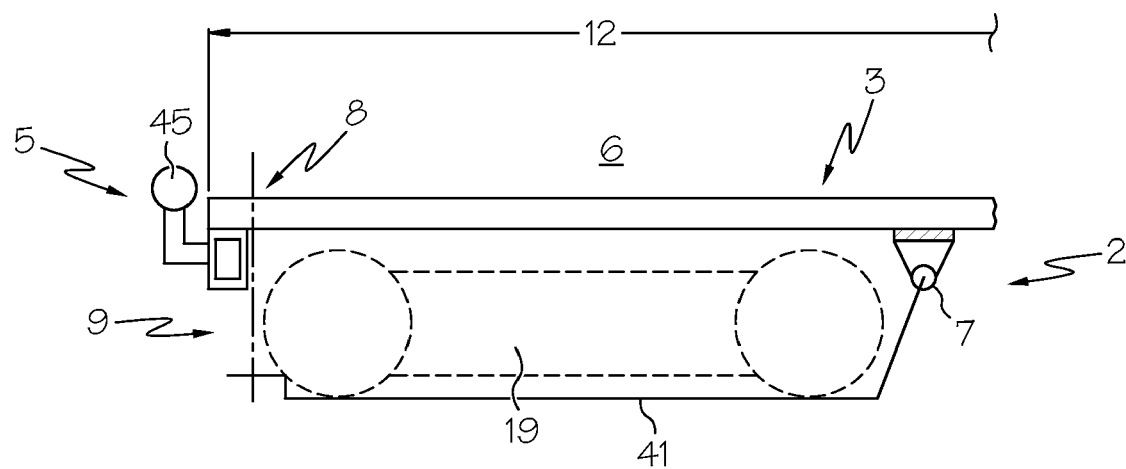
FIG. 7 shows a scheme drawing of a known spare tire holder in a locked position.
Figure 8:
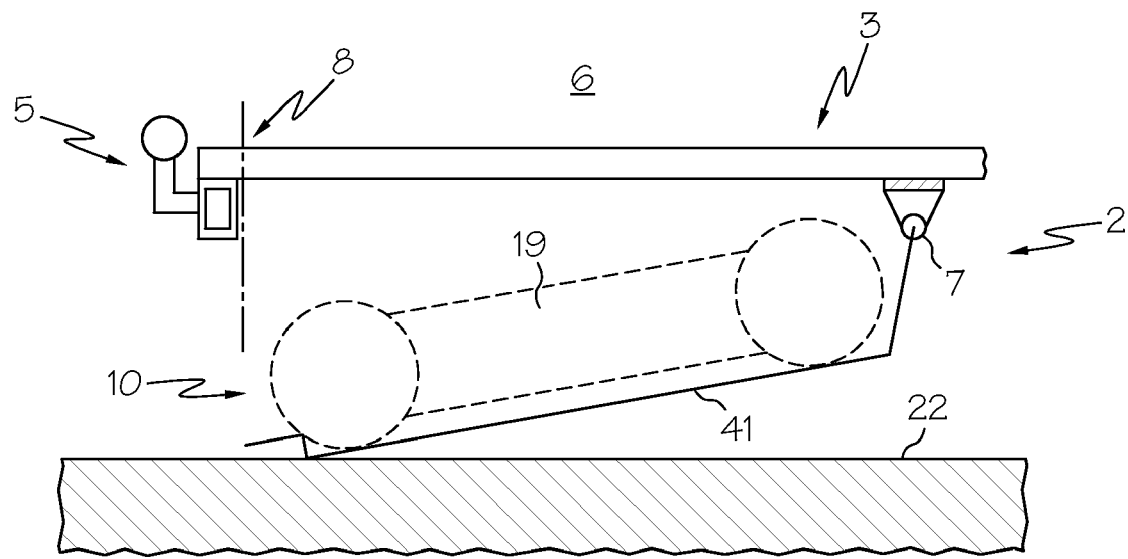
FIG. 8 shows a schematic drawing of the known spare tire holder according to FIG. 7 in a pivoted position.
Figure 9:
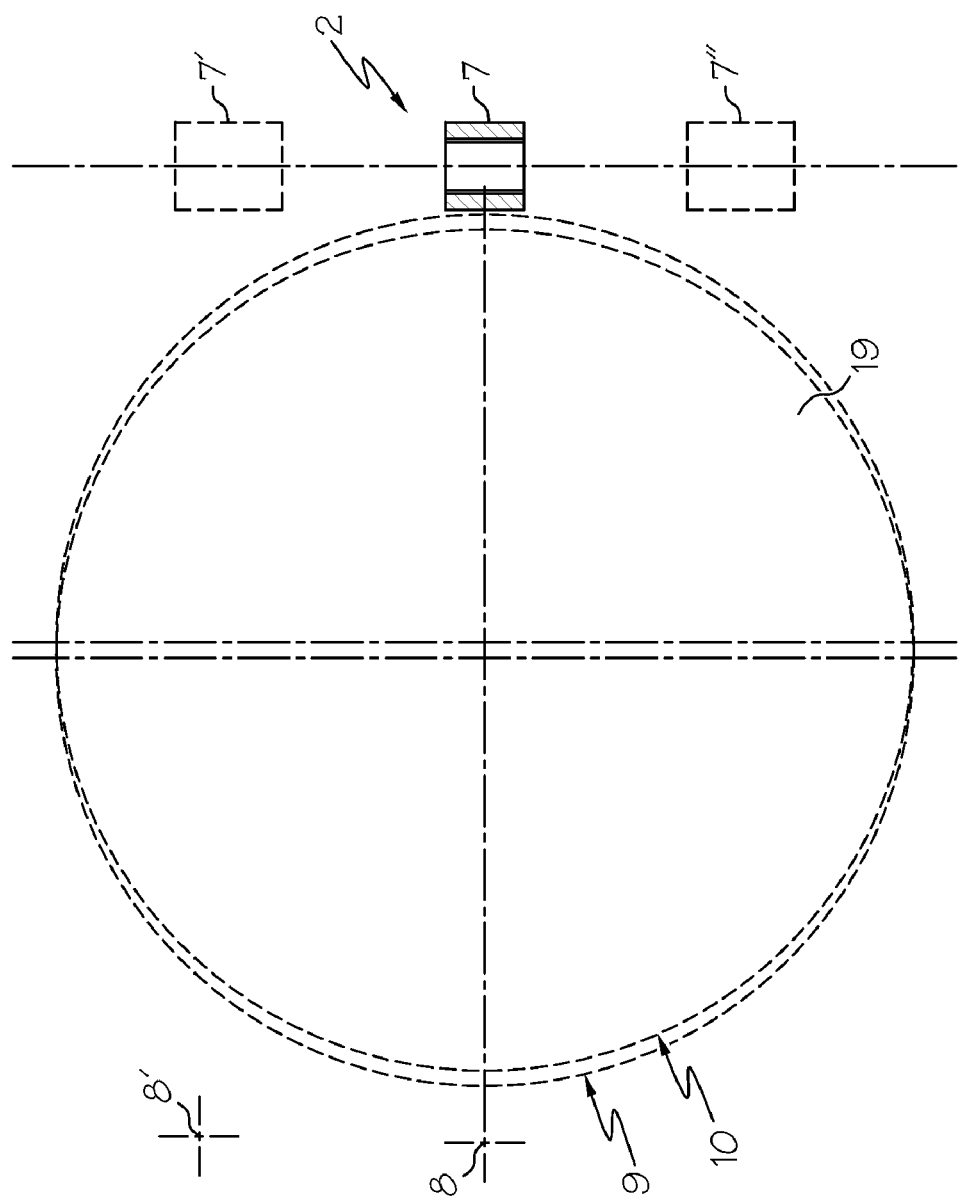
FIG. 9 shows a schematic drawing of the arrangement of the spare tire and the pivot joint of the spare tire holder according to the prior art.

FIG. 6 shows a schematic bottom view of the spare tire holder 1 according to FIG. 5. This figure shows the displacement toward the tail region 5 of the vehicle in the direction of the arrow C such that a second limb 24 of the swing arms 13 and 14 becomes visible. This figure also shows that the guide plates 39 and 40 that simultaneously act as heat shields can laterally guide the spare tire 19 during the removal thereof and thusly simplify the removal from the mount 4. If a trough is provided as shown in FIG. 1, this trough can slide out of the mount together with the spare tire and be subsequently accommodated in the mount again after the spare tire has been removed.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A spare tire holder for a vehicle, comprising:
a mount adapted to support a spare tire and to pivot downward in a tail region underneath said vehicle;
an actuating mechanism adapted to hold said mount in a locked position and to selectively release said mount from said locked position; and
two swing arms arranged on opposing sides of said mount, each swing arm comprising a double-jointed hinge having a first pivot joint and a second pivot joint arranged vertically on top of one another when said mount is in said locked position;
wherein said spare tire holder is configured to pivot downwardly toward the ground only about said second pivot joint, with said first and second pivot joints substantially vertically on top of one another, upon said spare tire holder being released from said locked position, and further wherein said spare tire holder is configured to pivot about said first and said second pivot joints when said spare tire holder is manually drawn rearwardly while said spare tire holder is not in said locked position; and
wherein each of said swing arms is bent in an L-shaped fashion, wherein a first limb of each swing arm forms an axle shaft of said first pivot joint, and ends of a second limb of each swing arm in which steel rod ends of said mount are arranged as axle shafts of said second pivot joint.

2. The spare tire holder according to claim 1, wherein each of said first pivot joints are fixed underneath said vehicle body and each of said second pivot joints are connected to said mount.

3. The spare tire holder according to claim 1, wherein said mount is connected to and arranged between each of said swing arms.

4. The spare tire holder according to claim 1, wherein said mount comprises a heat shield comprising two laterally arranged guide plates arranged on said mount between said spare tire and a component of said vehicle when said mount is in a locked position.

5. The spare tire holder according to claim 4, wherein said mount is configured to allow said spare tire to slide along said guide plates when said mount is released from said locked position.

6. The spare tire holder according to claim 1, wherein said mount comprises a plastic trough adapted to accommodate said spare tire.

7. The spare tire holder according to claim 1, wherein said first pivot joint and said second pivot joint are arranged vertically on top of one another and said swing arms are aligned vertically when said mount is in said locked position.

8. The spare tire holder according to claim 1, wherein, for each of said swing arms, said first pivot joint and said second pivot joint are arranged vertically with respect to one another, and said mount is tilted downwardly, when said mount is in a first pivoted position.

9. The spare tire holder according to claim 1, wherein, for each swing arm, said first pivot joint and said second pivot joint are arranged on top of one another and at an angle (α) with respect to a vertical plane, and said mount is tilted downwardly and displaced rearwardly toward said tail region of said vehicle in a longitudinal direction when said mount is in a second pivoted position.

10. A spare tire holder for a vehicle, wherein the vehicle has a reduced vehicle overhang between a rear wheel axle and a tail region, the spare tire holder comprising:

a mount adapted to pivot downward in said tail region underneath a car body;

an actuating mechanism adapted to hold said mount in a locked position and release said mount such that it can pivot into a pivoted position; and two swing arms arranged to both sides of said mount, each swing arm comprising a double-jointed hinge having a first pivot joint and a second pivot joint;

wherein each of said swing arms is bent in an L-shaped fashion, wherein a first limb of each swing arm forms an axle shaft of said first pivot joint, and ends of a second limb of each swing arm in which steel rod ends of said mount are arranged as axle shafts of said second pivot joint.

* * * * *